United States Patent
Kumar et al.

(10) Patent No.: US 12,287,685 B2
(45) Date of Patent: Apr. 29, 2025

(54) RESETTING SYSTEM SETTINGS MEMORIES

(71) Applicant: HEWLETT PACKARD ENTERPRISE DEVELOPMENT LP, Houston, TX (US)

(72) Inventors: Srinivas Chikkatur Ramesh Kumar, Karnataka (IN); Arunachalaprabhu Gunasekaran, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 141 days.

(21) Appl. No.: 17/975,078

(22) Filed: Oct. 27, 2022

(65) Prior Publication Data

US 2024/0143052 A1    May 2, 2024

(51) Int. Cl.
G06F 1/24 (2006.01)
G06F 11/14 (2006.01)

(52) U.S. Cl.
CPC .......... G06F 1/24 (2013.01); G06F 11/1417 (2013.01)

(58) Field of Classification Search
CPC .............................. G06F 1/24; G06F 11/1417
See application file for complete search history.

(56) References Cited

U.S. PATENT DOCUMENTS

| | | | | |
|---|---|---|---|---|
| 3,879,584 A * | 4/1975 | McCabe | ........... | H04M 1/27495 379/364 |
| 6,253,319 B1 * | 6/2001 | Tran | .......... | G06F 1/26 714/E11.134 |
| 7,839,188 B2 * | 11/2010 | Shi | .......... | G11C 7/20 327/143 |
| 8,438,423 B1 * | 5/2013 | Barkelew | ........... | G06F 11/1417 714/36 |
| 2004/0064686 A1 * | 4/2004 | Miller | .......... | G06F 9/4401 713/1 |
| 2012/0173891 A1 * | 7/2012 | Mo | .......... | G06F 1/24 713/300 |
| 2013/0057324 A1 | 3/2013 | Tu et al. | | |
| 2018/0121277 A1 | 5/2018 | Dougherty | | |

FOREIGN PATENT DOCUMENTS

| | | |
|---|---|---|
| CN | 104536551 A | 4/2015 |
| CN | 113703557 A | 11/2021 |

OTHER PUBLICATIONS

Intel, "Clear CMOS after Hardware Configuration Changes", Technical White Paper, Aug. 2018, 6 pages.
Intel, "How to Clear CMOS to Reset BIOS Settings in Systems with Intel® Desktop Boxed Processors", Mar. 24, 2020, 3 pages.

* cited by examiner

Primary Examiner — Yair Leibovich
(74) Attorney, Agent, or Firm — Slater Matsil, LLP (57) ABSTRACT

A method for resetting a system settings memory of processing circuitry of a computing system includes determining that a reset of the system settings memory is needed. At a controller coupled with a relay-based hardware circuit positioned between the system settings memory and a battery that backs the system setting memory, the method includes initiating clearing of the system settings memory of the processing circuitry of the computing system. Based on determining that a predetermined time period has passed from initiating the clearing of the system settings memory of the processing circuitry of the computing system, the method includes proceeding with a boot sequence for the computing system.

20 Claims, 5 Drawing Sheets

RESETTING SYSTEM SETTINGS MEMORIES

BACKGROUND

Various CPU-based products (e.g., systems-on-chip (SoC)) have a small amount of memory (e.g., a Complementary Metal-Oxide-Semiconductor (CMOS) region) that stores basic system settings (e.g., the Basic Input/Output System (BIOS) settings, Unified Extensible Firmware Interface (UEFI) settings, and/or other basic system settings). This memory may be referred to as a system settings memory. The system settings memory may be located on a computing device motherboard or integrated into the SoC/CPU. The basic system settings may be part of or may be used by software such as the BIOS, UEFI, or other low-level software or firmware configured to instruct a computing device/system on how to perform a number of basic functions such as booting and keyboard control. The aforementioned basic system settings may also be used to identify and configure hardware in the computing device/system.

BRIEF DESCRIPTION OF THE DRAWINGS

Various examples will be described below with reference to the following figures.

Throughout the drawings, identical reference numerals designate similar, but not necessarily identical, elements. Moreover, the drawings provide examples and/or implementations consistent with the description; however, the description is not limited to the examples and/or implementations provided in the drawings.

DETAILED DESCRIPTION

To bring up a device or system in an efficient way with the minimum boot time, the device/system saves settings in the system settings memory based on the hardware configurations of the most recent previous boot or, in the case of a first device/system boot, based on system default settings. In the event of a problem with any of the saved settings, such as problems arising from corruption in the system settings memory or from user error, the device/system may experience degraded performance, loss of functions, an incomplete boot, a complete failure to boot, and/or other issues that prevent the device/system from performing as designed. Sources of corruption may include, without limitation, electrostatic discharge (ESD), BIOS system updates, and replaced DRAM modules.

One way to cure a problem with the settings saved in the system settings memory is to reset the memory device to default settings. In some cases, the system settings memory also may need to be reset as part of a manufacturing process (regardless of whether an issue is detected), such as upon a first powering-on of the device/system or during or after validation, testing, or configuring of the device/system. Generally, resetting the system settings memory in this way requires the removal and reinsertion of a battery backing the system settings memory. More specifically, the battery may be provided in some devices/systems to ensure that when main device/system power is turned off the system settings nevertheless remain stored in the memory, and when this battery is removed (and the main power is off) the resulting loss of power to the system settings memory causes the data stored therein to be cleared. As a result, when the device/system is next powered on, the CPU will detect that the system settings memory has been cleared and in response will proceed to boot using default system values, which may be stored in the system settings memory in place of the previous values that were cleared as a result of the battery being removed (this is referred to herein as "resetting" the system settings memory).

Sometimes, such manual removal and reinsertion of the battery can be difficult to perform in the field, as the battery may be difficult to access, and in some cases may even require that the computing device be returned to the ODM where the computing device can be at least partially disassembled, the battery removed and reinserted, and the computing device reassembled. This is not only inconvenient for those utilizing computing devices in the field but also carries with it a substantial financial and time cost. Moreover, even in devices where the battery can be more easily accessed, it still takes time and effort for a user to do so. Furthermore, if a reset is needed during a manufacturing process, then this may require additional workers or robotic devices trained or configured to perform this process, which increases manufacturing complexity and costs, as well as the potential for additional corruption due, for instance, to electrostatic discharge.

To address the problems noted above, the present disclosure provides for clearing/resetting the system settings memory of a CPU without the need to remove and reinsert the battery backing the system settings memory. A relay-based hardware circuit may be positioned between the system settings memory of the CPU of the computing device and the battery that backs up the system settings memory. The relay-based circuit may be configured to supply power from the battery to the system settings memory in a default closed or connected position, or to cease supplying power from the battery to the system settings memory in an open or disconnected position. A controller configured for controlling the power sequencing of the motherboard of the computing device may control the state of the relay-based circuit. The controller may be the first component of the motherboard to receive power as it is applied to the motherboard. Prior to permitting power to be applied to other motherboard components, the controller may be configured to determine if a memory clear/reset is needed or desired. The controller may make such a determination based on receiving one or more corruption or other error indications, based upon receiving a request from a user to clear the system settings memory, or based on other criteria (such as it being a first boot of the system). Based on determining that a system settings memory clear is needed or desired, the controller may be configured to toggle a switch in the relay-based circuit from the default closed position to the open position for a predetermined period of time. As a result, the supply of power from the battery to the system settings memory region ceases. In some implementations, the predetermined period of time may be a time period that is sufficient to ensure that any remaining electrical charge transiently stored in the circuitry of the system settings memory dissipates such that the system settings memory is devoid of power (e.g., two seconds or less in some examples and/or more than 20 milliseconds in some examples). This causes the data stored in the system settings memory to be cleared. Once the predetermined period of time has passed, the controller may be configured to toggle the switch of the relay-based circuit from the open position back to the closed position, restoring the supply of power from the battery to the system settings memory. This toggle of the supply of power through the relay has the same effect, from the point of view of the CPU, as removing the battery and replacing it, and thus this triggers the CPU, once bootup resumes, to reset the system settings memory to the default settings values. Thus, the desired effect of resetting the system memory can be achieved without the need for manual removal and reinsertion of the battery.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Figure 1:
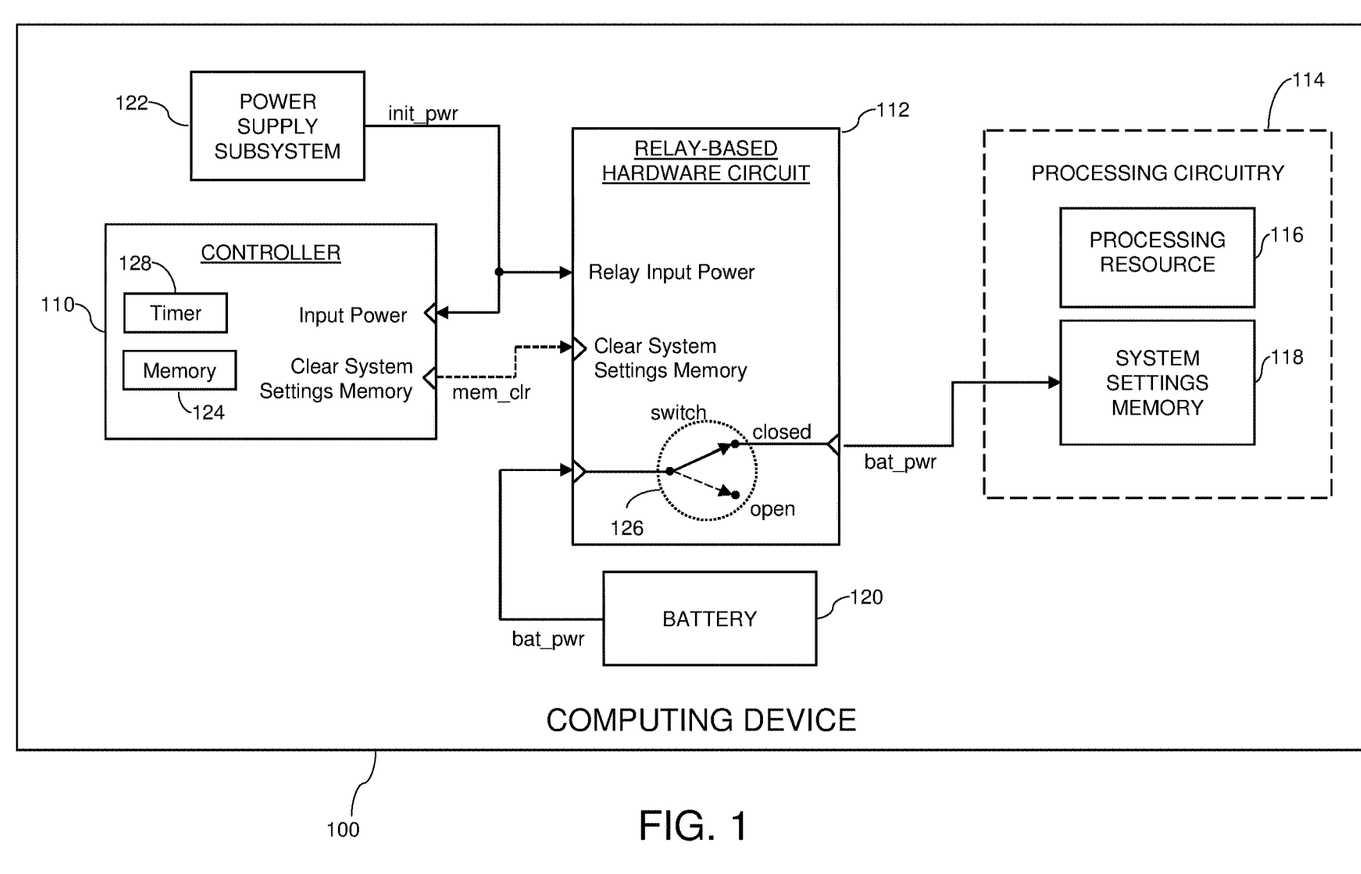
FIG. 1 is a block diagram of an example computing device/system in accordance with some implementations of the present disclosure.

FIG. 1 is a block diagram of a computing device 100 (e.g., a networking device) in accordance with some implementations of the present disclosure. The computing device 100 includes a controller 110, a relay-based hardware circuit 112 coupled with the controller 110, and processing circuitry 114. The controller 110 may include any dedicated hardware (e.g., an application-specific integrated circuit (ASIC), a field programmable gate array (FPGA), a complex programmable logic device (CPLD), etc.), and may be configured for controlling the power sequencing of the motherboard (not shown) of the computing device 100.

The processing circuitry 112 includes a processing resource 116 (e.g., a processor, a System-on-Chip (SoC), a central processing unit (CPU), a graphical processing unit (GPU), etc.), and a system settings memory 118. The system settings memory 118 may be integrated internally with the processing resource 116 or may be external to the processing resource 116 as shown. The system settings memory 118 may be configured to store basic system settings for the computing device 100. The basic system settings may be part of or used by software (e.g., the BIOS, UEFI, etc.) configured to instruct the computing device 100 on how to perform basic functions such as booting and keyboard control. The basic system settings may also be used to identify and configure hardware in the computing device 100.

The computing device 100 further includes a battery 120 backing up the system settings memory 118 and positioned such that the relay-based hardware circuit 112 is interposed in the power supply path between the battery 120 and the system settings memory 118. The battery 120 may be configured to supply power to the system settings memory (via the relay 112) to ensure that when main computing device power is not supplied to the system settings memory 118, the basic system settings remain stored in the system settings memory 118. However, the relay 112 may be able to selectively interrupt the flow of power from the battery under certain conditions (more fully described below), such that when main computing device power is not supplied to the system settings memory 118 the battery 120 is unable to supply power to the system settings memory 118 and thus the basic system settings stored in the system settings memory 118 are cleared and reset to default settings.

The controller 110 may be configured to initiate clearing of the system settings memory 118 utilizing the relay-based hardware circuit 112. In this regard, the controller 110, may be configured to control the power sequencing of the motherboard (not shown) of the computing device 100 and, accordingly, may control the state of the relay-based hardware circuit 112. When power is applied to the computing device motherboard (not shown) and received by a power supply subsystem 122 of the computing device 100, initialization power (init_pwr) is provided to the controller 110 to initialize the computing device 100 before the processing circuitry 114 is fully powered. The initialization power (init_pwr) may also be supplied to the relay-based hardware circuit 112, as will be described further below. As used herein, "power supply subsystem" is used to refer generally to all of the devices that collectively provide power to the computing device 100, which may include a power supply unit (PSU) and a number of power supply rails (which in turn may comprise power converters or other power delivery devices), with the power rails delivering different forms of power to various components of the computing device according to their needs (e.g., there may be a 12V power rail, a 5V power rail, a 3V power rails, etc.). The connections of the power supply subsystem 122 to other components are omitted from FIG. 1 to simplify the description.

Prior to permitting the power supply subsystem 122 to supply power to other computing device components (e.g., the processing circuitry 114, etc.), the controller 110 may be configured to determine if a memory clear/reset is needed or desired. In some implementations, the controller 110 may make such a determination based on receiving one or more corruption or other error indications, based upon receiving a request from a user to clear the system settings memory, or based on the present powering-on being the first powering-on of the controller 110 and/or the computing device 100. In the instance wherein a system settings memory 118 clear/reset is needed or desired based on the present powering-on being the first powering-on of the controller 110 and/or the computing device 100, the power-on history of the controller 110 may be examined. In one implementation, it may be determined whether the present powering-on is the first powering-on for the controller 110 and/or the computing device 100 by querying an internal non-volatile memory 124 of the controller 110, the internal non-volatile memory 124 being configured to store the power-on history of the controller 110/computing device 100.

Based on determining that a system settings memory clear is needed or desired, the controller 110 may be configured to send a memory clear signal (mem_clr) to the relay-based hardware circuit 112 requesting that the circuit 112 clear the system settings memory 118. Based on receiving the request, the relay-based hardware circuit 112 may be configured to toggle a switch 126 in the circuit 112 from a default closed position to an open position for a predetermined period of time, measured by a timer 128 of the controller 110. As a result, the supply of power (bat_pwr) from the battery 120 to relay-based circuit 112 and, accordingly, from the relay-based circuit 112 to the system settings memory 118, may cease. In some implementations, the predetermined time period may be a time period sufficient to ensure that any electrical charge transiently stored in the circuitry of the system settings memory 118 dissipates such that the system settings memory 118 is devoid of power (e.g., two seconds or less in some examples; greater than or equal to 20 milliseconds in some examples; between 20 milliseconds and two seconds in some examples). Once the predetermined time period has passed, the controller 110 may be configured to toggle the switch 126 of the relay-based circuit 112 from the open position back to the default closed position, restoring the supply of power from the battery 120 to the system settings memory 118. The controller 110, in turn, may increment the board power-on history counter in its non-volatile memory 124 for future use. Once the system settings memory 118 clear process is complete, the power sequence for all other rails may be followed as per usual.

Figure 2:
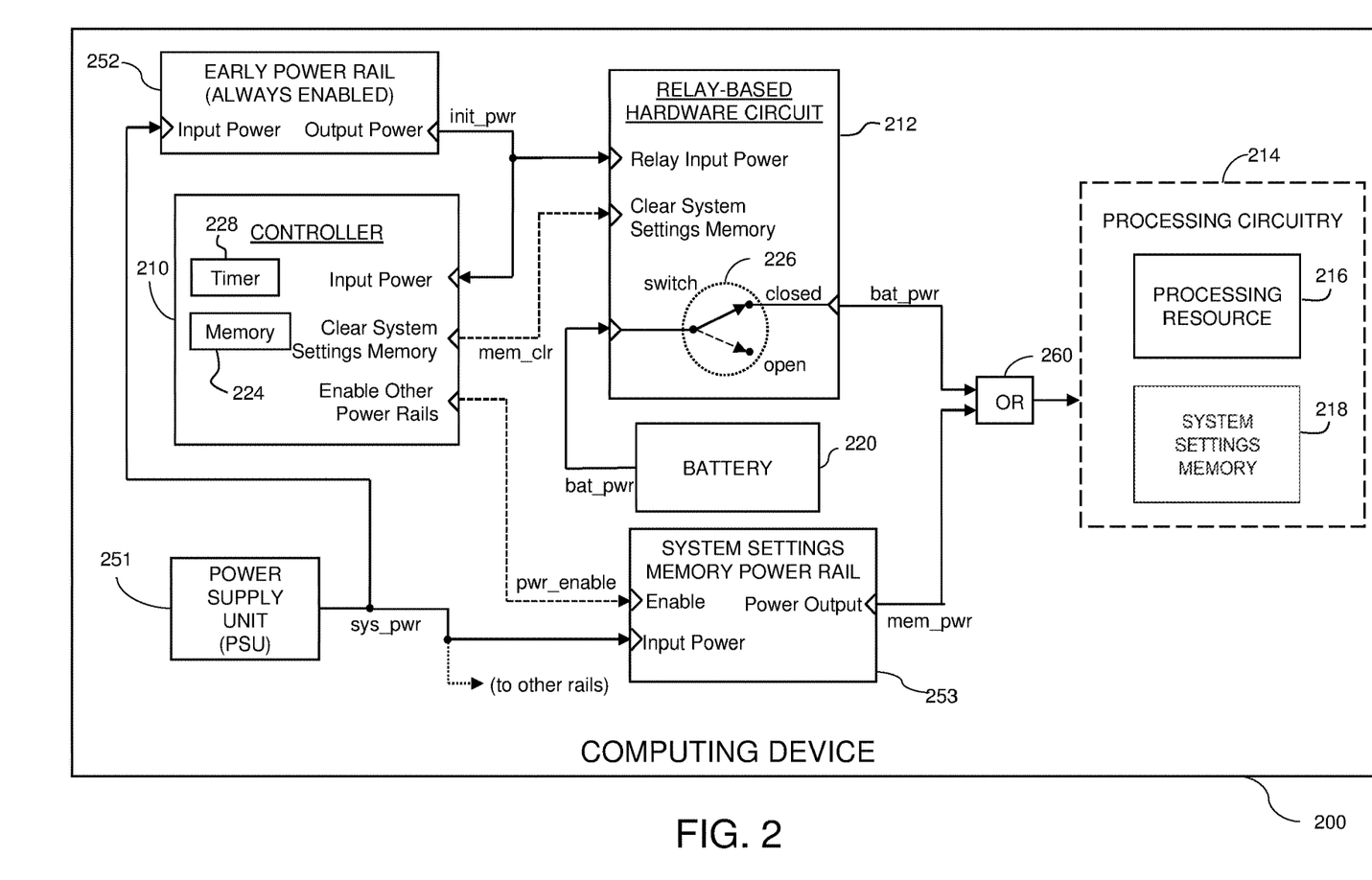
FIG. 2 is a block diagram of an example configuration of the computing device/system of FIG. 1, in accordance with one implementation of the present disclosure.

FIG. 2 is a block diagram of a computing device 200. The computing device 200 is an example configuration of the computing device 100 of FIG. 1, in accordance with one implementation of the present disclosure.

In particular, the computing device 200 comprises a power supply subsystem 221, which is one example configuration of the power supply subsystem 121. In this example, the power supply subsystem 221 comprises a power supply unit (PSU) 251 that receives input power from outside the computing device (e.g., from a mains power supply) and converts it into a system power signal sys_power suitable for use by various components of the computing device. For example, the PSU 221 may receive input AC power and convert it to DC power. In one example, the sys_power signal is a 12V DC power signal. The power supply subsystem 221 also comprises a number of power rails, including an Early Power Rail 252 and a System Settings Memory Power Rail 253 (additional power rails, not illustrated, may also be provided, such as a rail to provide power to the processing resource 216). The PSU 251 supplies the sys_power signal to each of the power rails, and each power rail may include DC-DC power conversion circuitry to convert the received sys_power signal into another power signal suitable for a particular component or subset of components of the computing device 200. For example, the early power rail and the system settings memory power rail may convert the sys_power signal at 12V DC into init_pwr and mem_pwr signals, respectively. These signals may be, in some examples, 3V DC power signals. The power rails generally are able to selectively supply their power output signals and do so only when they have been instructed to by the controller 210, for example via an enable signal (e.g., pwr_enable). An exception to this is the early power rail 252, which is always enabled and thus supplies the init_pwr signal whenever the PSU 251 is supplying the sys_pwr signal.

Thus, when external power is supplied to the PSU 251, the PSU 251 may supply sys_pwr to all of the rails, but initially the rails other than the early power rail 252 do not output any power to the downstream components because they have not yet been enabled by the controller 210. The early power rail, on the other hand, immediately beings supplying init_pwr. When the controller 210 receives init_pwr, it begins its powering-on sequence and, as part of this, performs the operations described above in relation to the controller 110. That is, the controller 210 determines if a reset of the system settings memory 218 is needed, if so the controller 210 sends the mem_clr signal to the relay-based hardware circuit 212 to cause the resetting as described above. On the other hand, if the controller 210 determines that no reset is needed, it may output the power_enable signal to each of the rails to enable them to begin supplying output power. For example, when the system settings memory power rail receives the pwr_enable signal, it begins supplying the mem_pwr output signal.

As shown in FIG. 2, the power output bat_pwr from the battery 220 is supplied to the relay-based hardware circuit 212, and the relay based hardware circuit 212 outputs this bat_pwr signal when the switch 226 is in the closed state. The relay based hardware circuit 212 is controlled to change the state of the switch 226 based on the mem_clr signal as described above.

As shown in FIG. 2, the computing device may also comprise an OR circuit 260. The OR circuit 260 may receive the bat_pwr signal output from the relay-based hardware circuit 212 and the mem_pwr signal from the system settings memory power rail 253, and may selectively supply one or the other to the system settings memory 218 to provide power thereto. Thus, during normal operation when the system settings memory power rail 253 is enabled, the system settings memory 218 may be powered by the mem_pwr signal. However, if power fails, then mem_pwr will cease and the OR circuit 260 may instead supply the bat_pwr signal from the battery to the system settings memory 218, thus ensuring that it can retain its settings. Similarly, if bat_pwr ceases while mem_pwr is still present, then mem_pwr may be supplied. Thus, in order to cause the clear of the system settings memory 218, both bat_pwr and mem_pwr need to be simultaneously removed. This is accomplished in examples disclosed herein by toggling the relay-based hardware circuit 212 while the computing device is in a state in which the system settings memory power rail 253 is not enabled (e.g., during startup but prior to the controller 210 sending out the pwr_enable signal to allow the full bootup sequence to continue).

The controller receives init_pwr at power on but system settings memory power rail is not yet enabled and thus mem_pwr is not active at this time. This is an important detail because otherwise the toggling of the switch in the relay would have no effect. Removing battery power only causes the CMOS to clear if the mem_pwr signal is also off-if the batter is toggled while mem_pwr is active, no clearing will occur. After the controller has determined that bootup can continue (for example, after clearing/resetting the CMOS, if needed), it will sent the pwr_enable signal and this causes mem_pwr to start being output.

Figure 3:
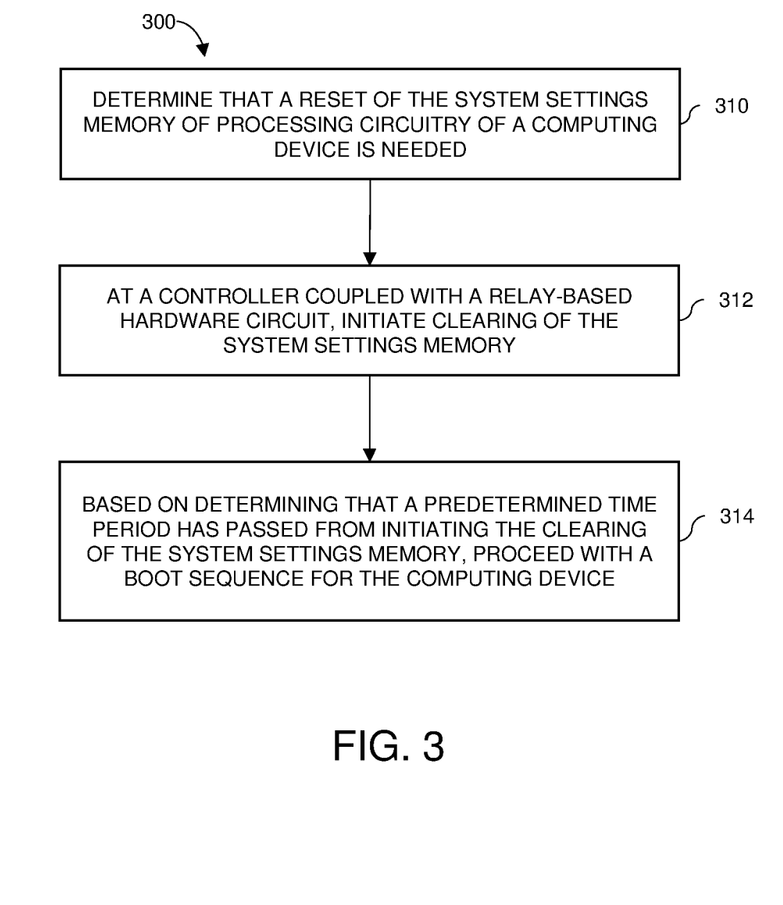
FIG. 3 is a flow diagram showing an illustrative method for resetting a system settings memory, in accordance with an example implementation of the present disclosure.

FIG. 3 is a flow diagram depicting an example method 300 for resetting a system settings memory (e.g., system settings memory 118 and/or 218) of the processing circuitry (e.g., processing circuitry 114 and/or 214) of a computing device. The method 300 may be performed, for example, by the computing devices 100, 200 described above. At step 310, it may be determined that a reset of the system settings memory is needed or desired. For example, it may be determined that a system settings memory reset is needed or desired based on receiving a request to reset the system settings memory, based on determining that an error occurred during execution of a boot sequence for the computing device, and/or based on determining that a controller and/or the computing device has not previously been booted (e.g., by querying an internal non-volatile memory of the controller that is configured to store the power-on history of the computing device).

At step 312, at a controller coupled with a relay-based hardware circuit, clearing of the system settings memory may be initiated (e.g., at controller 110, 210 of relay-based hardware circuit 112, 212). In one implementation, the controller may initiate clearing of the system settings memory utilizing the relay-based hardware circuit by toggling a switch (e.g., switch 126 and/or 226) of the circuit from a closed or connected state to an open or disconnected state for a predetermined period of time (e.g., less than two seconds). When the switch of the relay-based hardware circuit is in the closed state, a battery coupled therewith (e.g., battery 120 and/or 220) is capable of supplying power to the system settings memory and when the switch of the circuit is in the open state the battery is not capable of supplying power to the system settings memory. In addition, the changing of the switch to the open state is performed during a state in which a power supply rail that supplies power to the system settings memory is not currently supplying power to the system settings memory (e.g., prior to the controller enabling such supply). Thus, when the switch is opened, all power ceases to flow to the system settings memory.

At step 314, based on determining that the predetermined time period has passed since the clearing of the system settings memory was initiated, the method 300 may proceed with a boot sequence for the computing device. In some examples, the controller by cause the computing device to proceed with the boot sequence by enabling power delivery from the power supply subsystem to the other components of the device, for example by sending the enabling signals (e.g., pwr_enable) to the power rails that supply power to these components. In addition, the controller may toggle the switch of the relay-based hardware circuit from the open or disconnected state to the closed or connected state based on determining that the predetermined time period has passed. Moreover, proceeding with the boot sequence may cause the computing device to reset the system settings memory to default settings. That is, once the processing resource begins to boot up and notices that the system settings memory has been cleared, the processing resource may automatically restore the settings to default values as part of its boot-up sequence.

Figure 4:
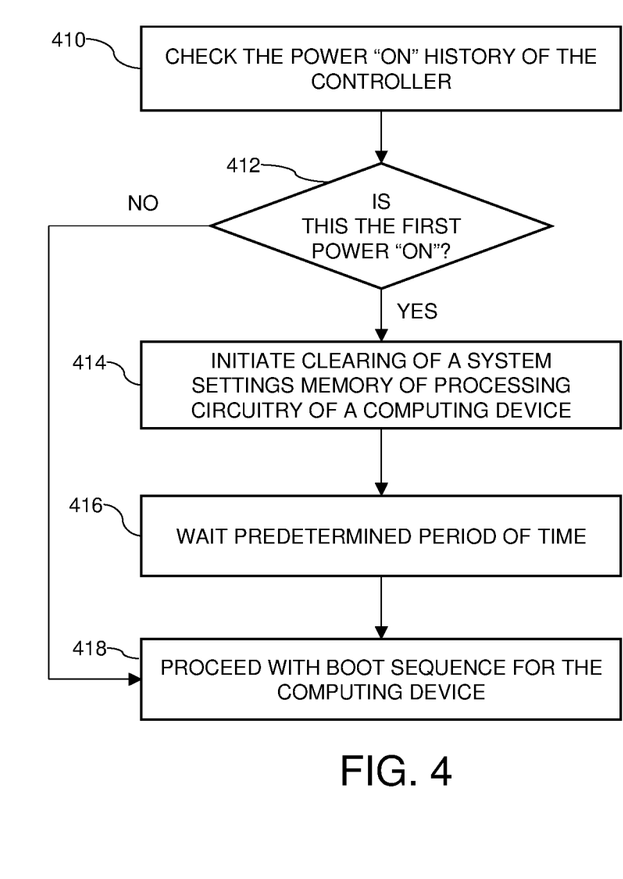
FIG. 4 is a flow diagram depicting an illustrative method for resetting a system settings memory, in accordance with an example implementation of the present disclosure.

FIG. 4 is a flow diagram depicting another example method 400 for resetting a system settings memory (e.g., system settings memory 118 and/or 218) of the processing circuitry (e.g., processing circuitry 114 and/or 214) of a computing device. The method 400 may be performed, for example, by the computing devices 100, 200 described above. At step 410, the power-on history of a controller (e.g., controller 110 and/or 210) of the computing device may be examined to determine whether a present powering-on is the first powering-on for the controller and/or the computing device. In one implementation, it may be determined whether the present powering-on is the first powering-on for the controller and/or the computing device by querying an internal non-volatile memory of the controller, the internal non-volatile memory being configured to store the power-on history of the computing device.

Upon determining at step 412 that the present powering-on is not the first powering-on for the controller and/or the computing device, the method 400 may proceed with a boot sequence for the computing device, as shown at step 418. Alternatively, upon determining at step 412 that the present powering-on is the first powering-on for the controller and/or the computing device, at step 414, a clearing of a system settings memory may be initiated. In one implementation, the controller may initiate clearing of the system settings memory utilizing a relay-based hardware circuit (e.g., the relay-based hardware circuit 112 and/or 212) by toggling a switch (e.g., switch 126 and/or 226) of the circuit from a closed or connected state to an open or disconnected state for a predetermined period of time (e.g., less than two seconds). In particular, the operations described above in relation to step 312 of the method 300 may be performed.

At step 416, the method 400 may wait for the predetermined period of time to pass since the clearing of the system settings memory was initiated and, at step 418, upon determining that the predetermined time period has passed, proceed with a boot sequence for the computing device. In addition, the controller may also toggle the switch of the relay-based hardware circuit from the open or disconnected state to the closed or connected state based on determining that the predetermined time period has passed. Moreover, proceeding with the boot sequence may cause the computing device to reset the system settings memory to default settings. That is, once the processing resource begins to boot up and notices that the system settings memory has been cleared, the processing resource may automatically restore the settings to default values as part of its boot-up sequence.

Figure 5:
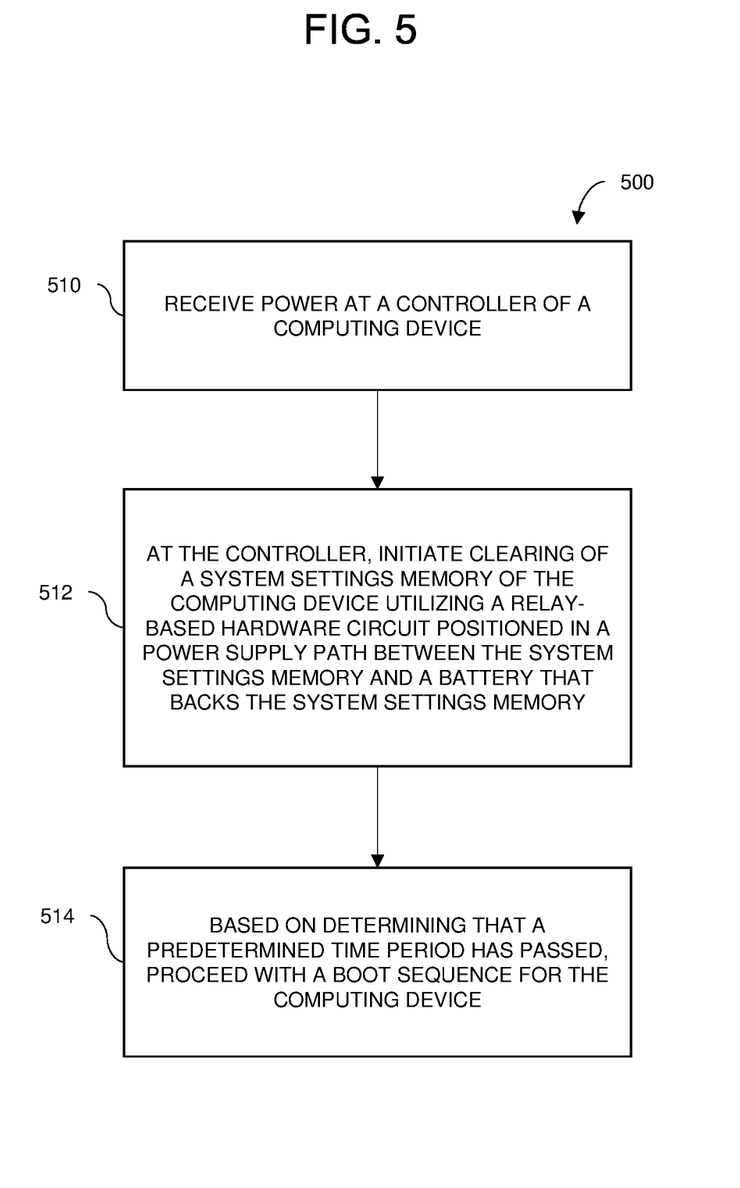
FIG. 5 is a flow diagram showing an illustrative method for resetting a system settings memory, in accordance with an example implementation of the present disclosure.

FIG. 5 is a flow diagram showing yet another example method 500 for resetting a system settings memory (e.g., system settings memory 118 and/or 218) of the processing circuitry (e.g., processing circuitry 114 and/or 214) of a computing device. The method 500 may be performed, for example, by the computing devices 100, 200 described above.

At step 510, power may be received at a controller (e.g., controller 110 and/or 210) of the computing device. At step 512, at the controller, a clearing of a system settings memory of the computing device may be initiated utilizing a relay-based hardware circuit (e.g., relay-based hardware circuit 112 and/or 212) positioned in a power supply path between the system settings memory and a battery (e.g., battery 120 and/or 220) that backs the system settings memory. In one implementation, the controller may initiate clearing of the system settings memory utilizing a relay-based hardware circuit (e.g., the relay-based hardware circuit 112 and/or 212) by toggling a switch (e.g., the switch 126 and/or 226) of the circuit from a closed or connected state to an open or disconnected state for a predetermined period of time (e.g., less than two seconds).

At step 514, based on determining that a predetermined time period has passed from initiating the clearing of the system settings memory, the method 500 may proceed with a boot sequence for the computing device. In one implementation, the controller may be configured to cause the computing device to proceed with the boot sequence by toggling the switch of the relay-based hardware circuit from the open or disconnected state to the closed or connected state based on determining that the predetermined time period has passed.

Figure 6:
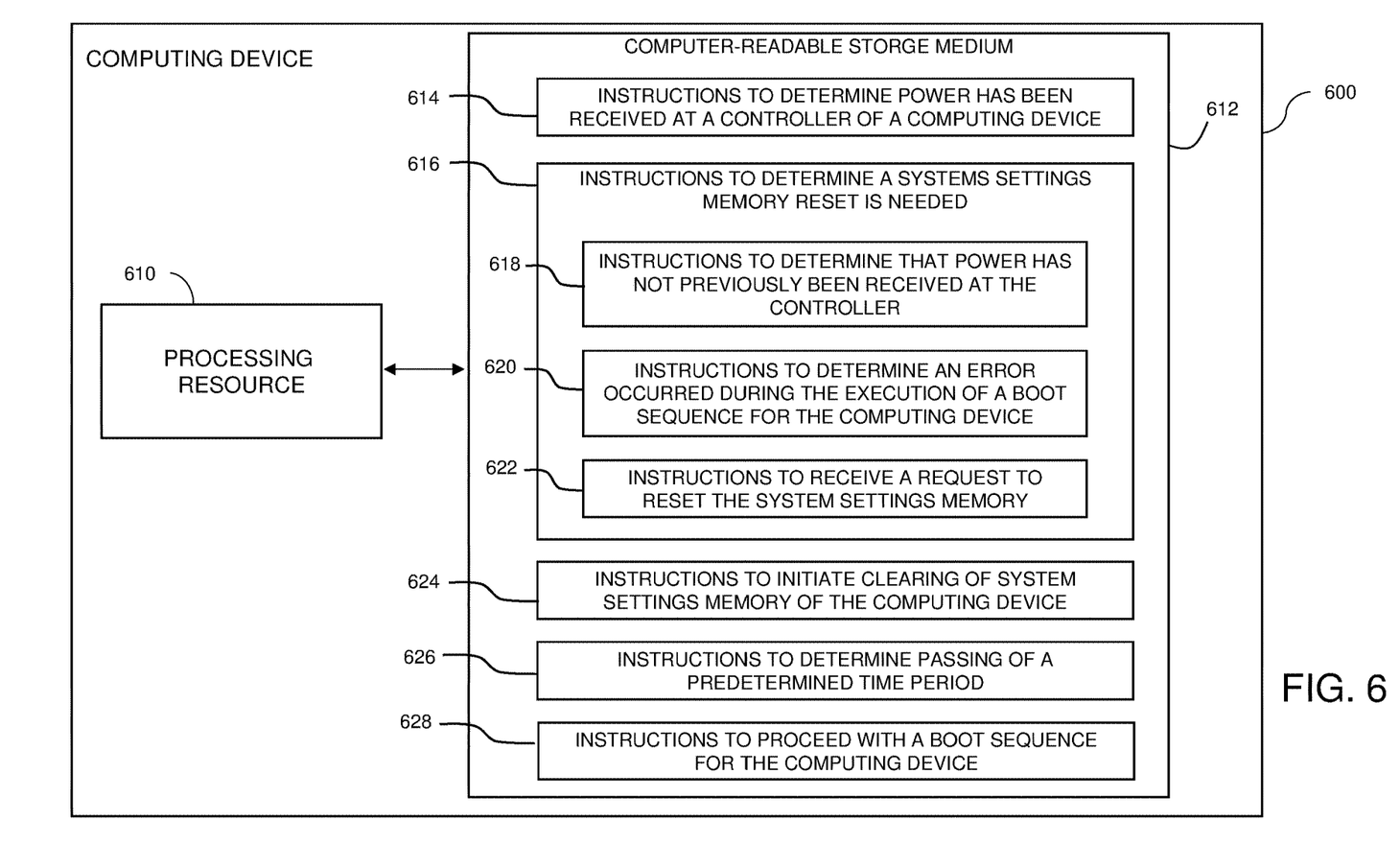
FIG. 6 is a block diagram showing an example computing device/system, in accordance with some implementations of the present disclosure.

FIG. 6 is a block diagram showing an example computing device/system 600, in accordance with some implementations of the present disclosure. In the example illustrated in FIG. 6, the computing device/system 600 includes a processing resource 610 coupled with a non-transitory, computer-readable medium 612 encoded with instructions to perform a systems settings memory reset. The processing resource 610 may include a microcontroller, a microprocessor, central processing unit core(s), graphical processing unit core(s), an application-specific integrated circuit (ASIC), a field programmable gate array (FPGA), and/or another hardware device suitable for retrieval and/or execution of instructions from the computer-readable medium 612 for causing the performance of the functions related to various examples described herein. Additionally, or alternatively, the processing resource 610 may include electronic circuitry for performing the functionality of the instructions described herein.

The computer-readable medium 612 may be any medium suitable for storing executable instructions. Non-limiting examples of computer-readable medium 612 include RAM, ROM, EEPROM, flash memory, a hard disk drive, an optical disc, or the like. The computer-readable medium 612 may be disposed within the computing device 600, as shown in FIG. 6, in which case the executable instructions may be deemed "installed" or "embedded" on the computing device 600. Alternatively, the computer-readable medium 612 may be a portable (e.g., external) storage medium, and may be part of an "installation package." The instructions stored on the computer-readable medium 612 may be useful for implementing at least the methods described herein (e.g., the methods shown in FIGS. 3, 4, and 5).

In the context of the present example, the computer-readable medium 612 is encoded with a set of executable instructions 614-628. It should be understood that part or all of the executable instructions and/or electronic circuits included within one block may, in alternate implementations, be included in a different block shown in the figures or in a different block not shown.

Instructions 614, upon execution, may cause the processing resource 610 to determine that power has been received at a controller of a computing device. In one implementation, instructions 614 may be useful for performing block 510 of FIG. 5.

Instructions 616, upon execution, may cause the processing resource 610 to determine that a system settings memory reset is needed or desired. In one implementation, instructions 616 may be useful for performing block 310 of FIG. 3.

Instructions 618, upon execution, may cause the processing resource 610 to determine that a system settings memory reset is needed or desired by determining that power has not previously been received at the controller. In implementations, instructions 618 may be useful for performing block 310 of FIG. 3 and/or block 412 of FIG. 4.

Instruction 620, upon execution, may cause the processing resource 610 to determine that a system settings memory reset is needed or desired by determining that an error occurred during the execution of a boot sequence for the computing device. In one implementation, instructions 620 may be useful for performing block 310 of FIG. 3.

Instructions 622, upon execution, may cause the processing resource 610 to determine that a system settings memory reset is needed or desired by receiving a request to reset the system settings memory. In one implementation, instructions 622 may be useful in performing block 310 of FIG. 3.

Instructions 624, upon execution, may cause the processing resource 610 to initiate clearing of the system settings memory of the computing device. In implementations, instructions 624 may be useful in performing block 312 of FIG. 3, block 414 of FIG. 4, and/or block 512 of FIG. 5.

Instructions 626, upon execution, may cause the processing resource 610 to determine that a predetermined time period has passed since the clearing of the system settings memory was initiated. In one implementation, instructions 626 may be useful in performing block 416 of FIG. 4.

Instructions 628, upon execution, may cause the processing resource 610 to proceed with a boot sequence for the computing device based on determining that the predetermined time period has passed since the clearing of the system settings memory was initiated. In implementations, instructions 628 may be useful in performing block 314 of FIG. 3, block 418 of FIG. 4, and/or block 514 of FIG. 5.

The technology described herein includes various steps, examples of which have been described above. As described further above, these steps may be performed by hardware components or may be embodied in computer-executable instructions, which may be used to cause a processing resource (e.g., a processor) programmed with the instructions to perform the steps. Alternatively, at least some steps may be performed by a combination of hardware, software, and/or firmware.

The technology described herein may be provided as a computer program product, which may include a tangible computer-readable storage medium embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/computer-readable medium suitable for storing electronic instructions (e.g., computer programming code, such as software or firmware).

In the technical description herein, numerous specific details are set forth in order to provide a thorough understanding of example implementations. It will be apparent, however, to one skilled in the art that implementations described herein may be practiced without some of these specific details. In other instances, well-known structures and devices are shown in block diagram form.

The terminology used herein is for the purpose of describing example implementations only and is not intended to be limiting. As used herein, the singular forms "a," "an," and "the" are intended to include the plural forms as well, unless the context clearly indicates otherwise. The term "plurality," as used herein, is defined as two, or more than two. The term "and/or" as used herein refers to and encompasses any and all possible combinations of one or more of the associated listed items. As used herein, the term "includes" means includes but not limited to, and the term "including" means including but not limited to. The term "based on" means based at least in part on. If the specification states a component or feature "may," "can," "could," or "might" be included or have a characteristic, that particular component or feature is not required to be included or have the characteristic. As used in the description herein, the meaning of "in" includes "in" and "on" unless the context clearly dictates otherwise.

Various methods described herein may be practiced by combining one or more computer-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

In the foregoing description, numerous details are set forth to provide an understanding of the subject matter disclosed herein. However, implementations may be practiced without some or all these details. Other implementations may include modifications and variations from the details discussed above. It is intended that the following claims cover such modifications and variations.

What is claimed is:

1. A system comprising:
a controller;
processing circuitry comprising a processing resource and a system settings memory;
a battery to back up the system settings memory; and
a default closed relay-based hardware circuit coupled between the battery and the system settings memory;
wherein the controller is coupled with the relay-based hardware circuit,
wherein the controller is configured to initiate clearing of the system settings memory of the processing circuitry by changing a state of the relay-based hardware circuit,
wherein the controller is configured to determine that a predetermined time period has passed since initiation of clearing of the system settings memory of the processing circuitry, and
wherein the controller is configured to cause, based on determining, by the controller, that the predetermined time period has passed since initiation of clearing of the system settings memory of the processing circuitry, a boot sequence for the system to proceed.

2. The system of claim 1, wherein the controller is configured to initiate clearing of the system settings memory of the processing circuitry by controlling the state of the relay-based hardware circuit by toggling a switch of the relay-based hardware circuit from a closed state to an open state for a predetermined time period, wherein in the closed state the battery is configured to supply power to the system settings memory and in the open state the battery is configured not to supply power to the system settings memory.

3. The system of claim 2, wherein the controller is configured to cause a boot sequence for the system to proceed by toggling the switch of the relay-based hardware circuit from the open state to the closed state based on determining that the predetermined time period has passed.

4. The system of claim 2, wherein the predetermined time period is greater than or equal to 20 ms.

5. The system of claim 1, wherein the controller is configured to initiate clearing of the system settings memory of the processing circuitry by controlling the state of the relay-based hardware circuit in a state in which power is not supplied by a power supply subsystem to the system settings memory of the processing circuitry.

6. The system of claim 1, wherein the system settings memory comprises a complementary metal oxide semiconductor (CMOS).

7. A method for resetting a system settings memory of processing circuitry of a computing device, the method comprising:
determining, by a controller, to reset the system settings memory;
initiating, by the controller coupled with a default closed relay-based hardware circuit coupled between the system settings memory and a battery that backs the system settings memory, clearing of the system settings memory of the processing circuitry of the computing device by changing a state of the relay-based hardware circuit;
determining, by the controller, that a predetermined time period has passed since initiation of clearing of the system settings memory of the processing circuitry of the computing device; and
causing, by the controller, based on determining, by the controller, that the predetermined time period has passed since initiating clearing of the system settings memory of the processing circuitry of the computing device, a boot sequence for the computing device to proceed.

8. The method of claim 7, wherein determining to reset the system settings memory comprises receiving, at the controller, a request to reset the system settings memory of the processing circuitry of the computing device.

9. The method of claim 7, wherein determining to reset the system settings memory comprises determining that an error occurred during execution of the boot sequence for the computing device.

10. The method of claim 7, wherein determining to reset the system settings memory comprises determining that the computing device has not ever previously been booted.

11. The method of claim 7, wherein initiating clearing of the system settings memory of the processing circuitry of the computing device comprises toggling a switch of the relay-based hardware circuit from a closed state to an open state for the predetermined time period, wherein in the closed state the battery is configured to supply power to the system settings memory and in the open state the battery is configured not to supply power to the system settings memory.

12. The method of claim 11, wherein the method further comprises toggling the switch of the relay-based hardware circuit from the open state to the closed state based on determining that the predetermined time period has passed.

13. The method of claim 7, wherein clearing of the system settings memory of the processing circuitry of the computing device by controlling the state of the relay-based hardware circuit is initiated in a state in which power is not supplied by a power supply subsystem to the system settings memory of the processing circuitry.

14. The method of claim 7, wherein the system settings memory comprises a complementary metal oxide semiconductor (CMOS).

15. The method of claim 7, wherein the predetermined time period is greater than or equal to 20 ms.

16. A non-transitory computer-readable storage medium having stored thereon, a set of computer-executable instructions for causing one or more processing resources of a controller of a computing system to:
receive power at the controller;
initiate, by the controller, clearing of a system settings memory of the computing system by changing a state of a default closed relay-based hardware circuit positioned in a power supply path between the system settings memory and a battery that backs the system settings memory;
determine, by the controller, that a predetermined time period has passed since initiation of clearing of the system settings memory of the computing system; and
cause, by the controller, based on determining, by the controller, that the predetermined time period has passed, a boot sequence for the computing system to proceed.

17. The non-transitory computer-readable storage medium of claim 16, wherein the set of computer-executable instructions cause the one or more processing resources to initiate clearing of the system settings memory of the computing system utilizing the relay-based hardware circuit by toggling a switch of the relay-based hardware circuit from a closed state to an open state for the predetermined time period, wherein in the closed state the battery is configured to supply power to the system settings memory and in the open state the battery is configured not to supply power to the system settings memory.

18. The non-transitory computer-readable storage medium of claim 17, wherein the set of computer-executable instructions cause the one or more processing resources to toggle the switch of the relay-based hardware circuit from the open state to the closed state based on determining that the predetermined time period has passed.

19. The non-transitory computer-readable storage medium of claim 16, wherein initiating clearing of the system settings memory of the computing system causes a reset of one or more system settings to a default system setting.

20. The non-transitory computer-readable storage medium of claim 16, wherein the set of computer-executable instructions cause the one or more processing resources to initiate clearing of the system settings memory of the computing system based on determining, from an internal non-volatile memory of the controller, that the controller has not previously received power.

\* \* \* \* \*